(12) United States Patent
Nakamura et al.

(10) Patent No.: US 9,643,284 B2
(45) Date of Patent: May 9, 2017

(54) WELDING WIRE AND WELDING METHOD

(71) Applicant: NATIONAL INSTITUTE FOR MATERIALS SCIENCE, Ibaraki (JP)

(72) Inventors: Terumi Nakamura, Ibaraki (JP); Kazuo Hiraoka, Ibaraki (JP)

(73) Assignee: NATIONAL INSTITUTE FOR MATERIALS SCIENCE, Tsukuba-Shi, Ibaraki (JP)

( * ) Notice: Subject to any disclaimer, the term of this patent is extended or adjusted under 35 U.S.C. 154(b) by 546 days.

(21) Appl. No.: 13/778,793

(22) Filed: Feb. 27, 2013

(65) Prior Publication Data

US 2013/0334189 A1   Dec. 19, 2013

Related U.S. Application Data

(63) Continuation-in-part of application No. 11/921,793, filed as application No. PCT/JP2006/311649 on Jun. 9, 2006, now abandoned.

(30) Foreign Application Priority Data

Jun. 10, 2005 (JP) ................... 2005-171434

(51) Int. Cl.
  *B23K 9/23* (2006.01)
  *B23K 35/24* (2006.01)
  (Continued)

(52) U.S. Cl.
  CPC .......... *B23K 35/24* (2013.01); *B23K 35/0261* (2013.01); *B23K 35/40* (2013.01)

(58) Field of Classification Search
  CPC ..... B23K 35/0261; B23K 35/24; B23K 35/40
  (Continued)

(56) References Cited

U.S. PATENT DOCUMENTS 2,510,960 A * 6/1950 Danhier ................... 219/69.15
2,789,065 A * 4/1957 Garriott ............ B23K 35/0261
  428/387

(Continued)

FOREIGN PATENT DOCUMENTS

JP  58-003797   1/1983
JP  03-029024   2/1991
(Continued)

OTHER PUBLICATIONS

JP2001205483A_translation.pdf.*
International Search Report mailed Sep. 5, 2006 for International Application No. PCT/JP2006/311649.

*Primary Examiner* — Dana Ross
*Assistant Examiner* — Ket D Dang
(74) *Attorney, Agent, or Firm* — Wenderoth, Lind & Ponack, L.L.P.

(57) ABSTRACT

A welding wire is formed from a hoop having an inner surface and formed from a metal material, a core wire having a surface and formed from a metal material, and an alkaline metal compound. The hoop metal material and the core wire metal material are different from each other. A composition of the welding wire is divided into the hoop metal material and the core wire metal material. The alkaline metal compound is disposed between the inner face of the hoop and the surface of the core wire. An amount of the alkaline metal compound is from more than 10 ppm to 1000 ppm based on a weight of the welding wire.

3 Claims, 13 Drawing Sheets

Type I

Type II

(51) Int. Cl.
*B23K 35/40* (2006.01)
*B23K 35/02* (2006.01)

(58) Field of Classification Search
USPC .......... 219/146.52, 146.3, 146.32, 137 WM, 219/146.1
See application file for complete search history.

(56) References Cited

U.S. PATENT DOCUMENTS

| | | | |
|---|---|---|---|
| 2,909,778 A * | 10/1959 | Landis et al. .............. | 219/146.3 |
| 2,943,180 A | 6/1960 | Kelker | |
| 3,147,362 A | 9/1964 | Ramsey et al. | |
| 3,513,289 A * | 5/1970 | Johnston ............ | B23K 35/3053 219/146.31 |
| 3,531,620 A * | 9/1970 | Horiuchi et al. ........ | 219/146.52 |
| 3,557,340 A | 1/1971 | Srivastava | |
| 3,590,211 A | 6/1971 | Ballass et al. | |
| 3,866,015 A | 2/1975 | Matsumoto et al. | |
| 4,048,705 A | 9/1977 | Blanpain et al. | |
| 4,072,845 A * | 2/1978 | Buckingham ........ | B23K 35/368 219/146.3 |
| 4,137,446 A | 1/1979 | Blanpain et al. | |
| 4,203,188 A * | 5/1980 | Blanpain et al. .................. | 419/4 |
| 4,229,873 A | 10/1980 | Bykhovsky et al. | |
| 4,245,145 A | 1/1981 | Maniar et al. | |
| 4,313,045 A | 1/1982 | Agusa et al. | |
| 4,396,822 A * | 8/1983 | Kishida .............. | B23K 35/3066 219/137 WM |
| 4,913,927 A * | 4/1990 | Anderson ............ | B23K 35/286 219/137.2 |
| 4,958,060 A | 9/1990 | Mankins et al. | |
| 4,999,478 A | 3/1991 | Bushey et al. | |
| 5,095,191 A | 3/1992 | Bushey et al. | |
| 5,710,382 A * | 1/1998 | Dunmead et al. .............. | 75/230 |
| 6,664,510 B2 | 12/2003 | Ito et al. | |
| 7,026,576 B2 | 4/2006 | Inui et al. | |
| 7,091,448 B2 | 8/2006 | North et al. | |
| 7,807,948 B2 | 10/2010 | Katiyar | |
| 2001/0008235 A1 * | 7/2001 | Miszczak ........... | B23K 35/0266 219/146.1 |
| 2002/0012810 A1 * | 1/2002 | Osame ............... | B23K 26/0604 428/650 |
| 2003/0189034 A1 | 10/2003 | Kataoka et al. | |
| 2006/0076336 A1 | 4/2006 | Nagarajan et al. | |

FOREIGN PATENT DOCUMENTS

| | | | |
|---|---|---|---|
| JP | 03-077035 | 4/1991 | |
| JP | 05-010428 | 1/1993 | |
| JP | 08-002514 | 1/1996 | |
| JP | 08-022471 | 1/1996 | |
| JP | 2501567 | 3/1996 | |
| JP | 08-090275 | 4/1996 | |
| JP | 2556847 | 9/1996 | |
| JP | 11-104887 | 4/1999 | |
| JP | 2001205483 A * | 7/2001 | .......... B23K 35/368 |
| JP | 2003-290927 | 10/2003 | |
| JP | 2006-110629 | 4/2006 | |

* cited by examiner (a) When a potassium metal compound is not applied between the layers.

(b) When a potassium metal compound is applied between the layers.

(a) When a potassium metal compound is not applied between the layers (b) When a potassium metal compound is applied between the layers (a) When a potassium metal compound is not applied between the layers (b) When a potassium metal compound is applied between the layers (a) Stable Arc Behavior (b) Stable Bead Without Cleaning Region

| | Wire C | Wire D |
|---|---|---|
| Cross-section |  |  |
| K Composition, wt% | 0.001 | 0.009 |

WELDING WIRE AND WELDING METHOD

CROSS-REFERENCE TO RELATED APPLICATION

This application is a continuation-in-part of U.S. application Ser. No. 11/921,793, filed Feb. 29, 2008, which is a national stage application of International application PCT/JP2006/311649, filed Jun. 9, 2006, the entireties of which are incorporated herein by reference.

BACKGROUND OF THE INVENTION

I. Technical Field

The present invention relates to a welding wire and welding method.

II. Description of the Related Art

Safety is strongly required regarding the welded portions of structures using high grade steels such as 9% Ni steel and stainless steel intended for low temperature or intended for atomic energy, chemical plants, etc., and it is essential to form defect-free welded metals with excellent toughness and ductility. In order to obtain high quality welded joints in such structures, welding in an inert gas (argon, helium or a mixture gas thereof) atmosphere is indispensable. When welding in an inert gas atmosphere, only non-consumable electrode tungsten inert gas (TIG) arc welding of low production efficiency is available presently. TIG welding has been carried out for as long as 30 or more years at the expense of productivity.

On the other hand, although arc welding of excellent production efficiency, such as consumable electrode (welding wire) MIG or MAG arc welding has been employed widely in a production site, it is considered impossible to apply this welding method to an inert gas atmosphere. The reason is that the concentration point (cathode spot) of a local arc current formed in the surface oxide of a material to be welded (base material) moves around randomly and violently in search of an oxide, and the arc becomes unstable leading to the generation of welding defects such as meandering beads, blow holes and undercuts, thereby not forming a good welded portion.

In MIG arc welding, in order to solve the instability of the arc in the case where the welding is carried out in an inert gas atmosphere, it is proposed to add roughly 0.5 to 5% of an active gas such as oxygen gas or carbon dioxide gas to an inert gas atmosphere (shield gas) and form an oxide on the weld metal (weld pool) surface to restrain the behavior of the cathode spot. However, although the addition of an active gas certainly is effective in stabilizing on the arc, 200 ppm or more of oxygen is contained in a weld metal, and thus poses a problem in that the formation of fine oxide inclusions lowers the ductility and toughness of the welded metal site.

Therefore, a welding method in an inert gas atmosphere that can achieve both high productivity and high quality at the same time is desirable.

SUMMARY OF THE INVENTION

The welding wires used for welding are roughly classified into two categories. One is a solid wire produced by melting metal of the required composition and then drawing it; the other is a metal cored wire produced by adding a metal powder into a flux cored wire or flux made by enclosing a flux with a material called a hoop (Practices of Flux-Containing Wires, edited by Welding Consumable Division, The Japan Welding Engineering Society; Sanpo Publications, Incorporated; First Edition, April, 1994; pp. 23-49 and Japanese Patent Application Laid-Open No. 5-10428).

For solid wires, homogeneous wires are usually produced. However, cracks may be generated in the processing step to a wire, the yield of a wire is small, or the production of a wire is absolutely difficult.

The production of a flux cored wire or metal cored wire normally accompanies the use of a flux together for improvement of welding performability, and in particular an oxygen-containing flux is used. Because of this, the amount of oxygen is increased in the welded metal, and toughness cannot be ensured. Additionally, the flux has hygroscopicity, and therefore hydrogen is permeable to the welded metal; as a result, cracks at low temperature may be possibly generated. Accordingly, although a flux is effective for improvement of welding performability, it is likely to cause a problem in performance of welded metal sites.

On the other hand, it is proposed that alkaline metal compounds are effective for stabilization of the arc (Japanese Patent Application Laid-Open No. 58-3797, Japanese Published Examined Application No. 3-77035, Japanese Patent Application Laid-Open No. 8-90275, Japanese Published Examined Application No. 2556847 and Japanese Patent Application Laid-Open No. 2003-290927). However, even in any of the proposals, because an alkaline metal compound is stuck or applied to the surface of a solid wire, it is difficult to quantitatively control the alkaline metal compound at the time of sticking/application, and additionally there is a problem in that the alkaline metal compound is peeled off by handling during welding. It is difficult to appropriately control the amount of an alkaline metal compound required for the stabilization of the arc.

The present invention has been made in consideration of the above issues, and an object of the present invention is to provide a welding wire capable of stable welding in an inert gas atmosphere, of readily being made into wire, and of properly being controlled in an amount of an alkaline metal compound, and a method of stable welding in an inert gas atmosphere by use of this welding wire.

As a wire that solves the above problems, the following welding wire is provided.

A welding wire comprises:

a hoop having an inner surface, and being formed from a metal material;

a core wire having a surface, and being formed from a metal material; and an alkaline metal compound, wherein said hoop metal material and said core wire metal material are different from each other, a composition of said welding wire is divided into said hoop metal material and said core wire metal material, and said alkaline metal compound is disposed between said inner face of said hoop and said surface of said core wire, and an amount of said alkaline metal compound is from more than 10 ppm to 1000 ppm based on a weight of said welding wire.

Preferably, the alkaline metal compound is a potassium metal compound.

The following welding method is also provided.

A consumable electrode welding method using a welding wire comprises:

a hoop having an inner surface, and being formed from a metal material;

a core wire having a surface, and being formed from a metal material; and an alkaline metal compound, wherein said hoop metal material and said core wire metal material are different from each other, a composition of said welding wire is divided into said hoop metal material and said core wire metal material, and said alkaline metal compound is disposed between said inner face of said hoop and said surface of said core wire, and an amount of said alkaline metal compound is from more than 10 ppm to 1000 ppm based on a weight of said welding wire, and wherein said consumable electrode welding method comprising using said welding wire as an anode and conducting the welding in a shield gas which contains an inert gas with a concentration of 99.5% or more.

The behavior of the arc is stabilized during welding and welding ease and efficiency is improved. Additionally, the oxygen content in the welded metal is reduced to a level equivalent to the level of the TIG welding in which the highest quality welded joint is obtained in the existing welding methods.

Furthermore, it becomes possible to make a wire from a material that is difficult to process and that posed difficulties in making it into a wire in a solid wire requiring a homogeneous composition, and it is also expected to readily control the suppliability of a solid wire conventionally which was difficult to be supplied.

DETAILED DESCRIPTION OF THE INVENTION

A welding wire of the present invention belongs to a solid wire not containing a flux at all, or a cored wire, made from a metal powder only, not containing a flux at all, and is a novel one not conventionally known.

Figure 1:
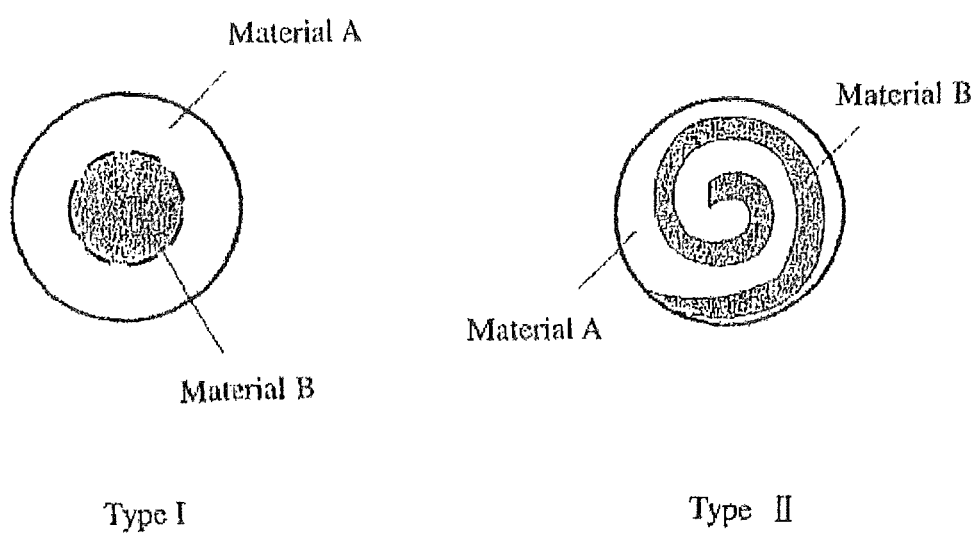
FIG. 1 is a sectional view showing an overview of a welding wire of the present invention.

For a welding wire of the present invention, for example, a composition to be required is divided into a plurality of matters, and individual metal materials of a plurality of compositions having good processability, compositions excellent in wire feedability properties, and the like are laminated to be wire processed as shown in FIG. 1. The cross section of the wire can be also an involution type like type II in addition to a coax of type I. When a composition of specific proportions per unit length (calculated from density×area) is met, the required composition is divided into a plurality of matters. Where the individual metal materials are laminated, the materials are made to be a melt alloy in a droplet or molten pool during welding to obtain a necessary metal composition.

The solid wire is produced, as described above, by melting and then drawing. At this time, alkaline metal compounds are generally difficult to melt and cannot also be melted homogeneously. Because of this, an alkaline metal compound cannot be effectively mixed into a welding wire for use.

In a welding wire of the present invention, a required alkaline metal compound is contained in between the layers of a laminate material by means of coating, encapsulation, or the like, to capture a component which cannot be melted, and the property of the component is made exhibited during arc welding. In this case, a plurality of laminate materials are not necessarily different materials and materials having the same composition can also be employed.

The examples of alkaline metal compounds of the present invention include oxides and hydroxides containing at least one species of the alkaline metal elements selected from lithium, potassium, sodium and the like, halogenated substances such as chlorides and iodides, inorganic acid salts of carbonic acid, bicarbonic acid, phosphoric acid, sulfuric acid, nitric acid, perchloric acid, pyrophosphoric acid, and the like, and organic acid salts of acetic acid, phthalic acid, terephthalic acid, stearic acid, oleic acid, and the like. A variety of alkaline metal compounds can be adopted so long as they do not deteriorate the properties of welded sites. Of these, examples of preferred alkaline metal compounds exhibiting excellent effects include single compounds of potassium metal compounds alone or in its mixture with other alkaline metal compounds.

Although the range in which alkaline metal compounds enclosed in a welding wire show excellent effects varies depending on the kind of alkaline metal compounds, it is from more than 10 ppm to 1000 ppm based on the weight of the welding wire. When the amount of alkaline metal compound is more than 10 ppm, stability of welding by using the welding wire increases. On the other hand, the increase of the amount of alkaline metal compound affects ductility of the welded material because the amount of oxygen included in the welding metal increases and therefore it is appropriate that the upper limit of the amount of the alkaline metal compound is 1000 ppm.

Although the alkaline metal compound can be enclosed in the form of a fine powder, it can also be dissolved or dispersed in an appropriate solvent and applied for encapsulation. For instance, a high concentrated aqueous solution of an alkaline metal compound using a silicate salt generally called water glass (potassium silicate, sodium silicate, lithium silicate, a mixture thereof, or the like) is applied between the layers of a laminate material and the compound can be enclosed in a welding wire. Water glass is a high-viscosity, liquid-like starch syrup and is a compound readily used at the time of fabrication/processing of a welding wire of the present invention.

The use of a welding wire of the present invention renders it possible to stably and rapidly carry out welding in an inert gas atmosphere, which has conventionally been thought to be extremely difficult to carry out without simultaneous use of a flux or addition of an active gas.

The inert gases that can be used include, for example, argon, helium and mixture gases thereof. In addition, if the concentration of an inert gas in an inert gas atmosphere is controlled to be above 95%, and more preferably 99.5% or more, the mixing of oxygen into welded metal sites is constrained and welding with no defects and excellent toughness and ductility can be carried out.

Additionally, although depending on welding conditions, the use of a welding wire of the present invention and the control of the concentration of an inert gas in an inert gas atmosphere make it possible to control the oxygen content in the welded metal to be 100 ppm or less.

Test Example 1

For the fabrication of a wire of 11Cr-9.5Ni-based low transformation temperature welding material, an alloy of its composition is normally melted and drawing processing is carried out. Its raw material often generates cracks in the step of drawing and the yield is about 50%.

Figure 2:
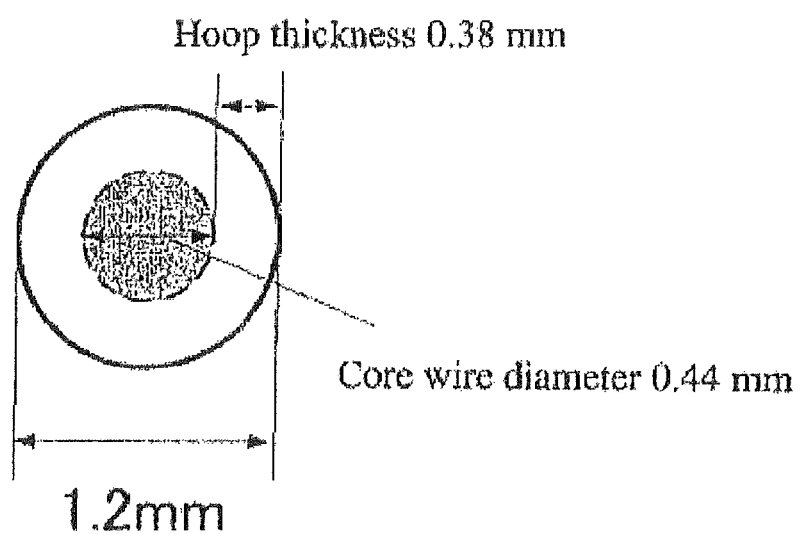
FIG. 2 is a sectional view showing the welding wire of Test Example 1.

Then, a welding wire was fabricated by using and combining metal materials having two kinds of compositions shown in FIG. 2 and Table 1.

TABLE 1

| | | C | Ni | Cr | Si | Mn |
|---|---|---|---|---|---|---|
| Hoop | For curing build up | 0.1 | 0 | 10 | 0.8 | 1.6 |
| Core wire material | Inconel | 0.03 | 73.94 | 18.38 | 0.19 | 2.99 |
| Target alloy material | 11Cr—9.5Ni material | 0.09 | 9.24 | 11.05 | 0.72 | 1.77 |

A welding wire having a diameter of 1.2 mm, the composition of which corresponds to that of an 11Cr-9.5Ni-based low transformation temperature welding material could be fabricated by using and combining a hoop having a plate thickness of 0.38 mm and a core wire having a diameter of 0.44 mm. Both hoop and core wire were good in processability, cracks were not generated in the step of drawing, and the yield was greatly improved.

Test Example 2

In consumable electrode welding, good welding cannot be carried out unless a welding wire is stably supplied during welding. If the welding wire is too rigid, the feed resistance becomes large. In addition, where the welding wire is extremely rigid as compared with the contact tip, the wear of the contact tip is increased, so that clogging or the like is generated and it becomes difficult to carry out good welding. A low transformation temperature welding material is a high strength material having a strength of 1000 MPa or more and has a problem in welding wire feeding. However, the welding wire of Test Example 1 has a strength of 600 MPa or less, and is thought to be improved in feedability properties.

This test example then used a high strength welding material having a strength of about 780 MPa.

Figure 3:
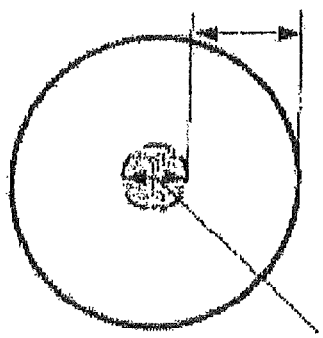
FIG. 3 is a sectional view showing the welding wire of Test Example 2.

The combination of a hoop having a wire component for SM490 and a diameter of 0.5 mm and a core wire of inconel having a diameter of 0.2 mm, shown in FIG. 3 and Table 2, made it possible to fabricate a welding wire, the composition of which corresponds to that of a welding material for HT780.

TABLE 2

| | | C | Ni | Cr | Si | Mn |
|---|---|---|---|---|---|---|
| Hoop | For SM490 | 0.09 | 0 | 0 | 0.4 | 1 |
| Core wire material | Inconel | 0.005 | 78 | 16 | 0 | 0.03 |
| Target alloy material | For HT780 | 0.09 | 2.34 | 0.48 | 0.39 | 0.97 |

Figure 4:
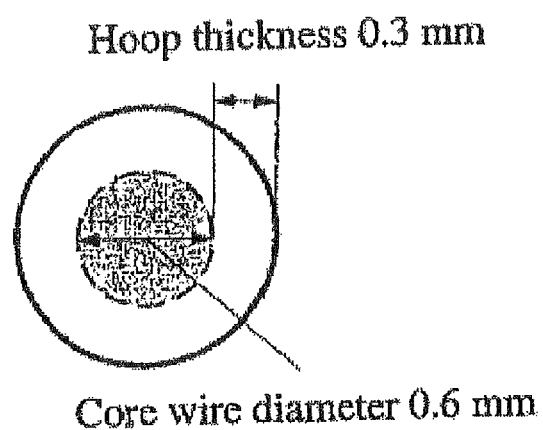
FIG. 4 is a sectional view showing the welding wire of Test Example 2.

The core wire and hoop are not necessarily commercially available materials. As shown in FIG. 4 and Table 3, a hoop and core wire can be designed in such a manner that the composition becomes a welding wire corresponding to that of a welding material for HT780.

This welding wire had a hardness equivalent to that of a welding material for SM490 and was a welding wire posing no problems in feedability properties, wear of the contact tip, etc. The core wire diameter is 0.6 mm. The above welding wire can have a thick core wire and in fabrication of a welding wire is superior when compared to the welding wire indicated in FIG. 3.

TABLE 3

| | | C | Ni | Cr | Si | Mn |
|---|---|---|---|---|---|---|
| Hoop | Material A | 0.09 | 0 | 0 | 0.4 | 0.4 |
| Core wire material | Material B | 0.05 | 11.1 | 2.13 | 0 | 0.01 |
| Target alloy material | For HT780 | 0.08 | 2.61 | 0.50 | 0.31 | 0.31 |
| | For HT780 | 0.08 | 2.6 | 0.5 | 0.31 | 0.31 |

EXAMPLES

Example 1

Figure 5:
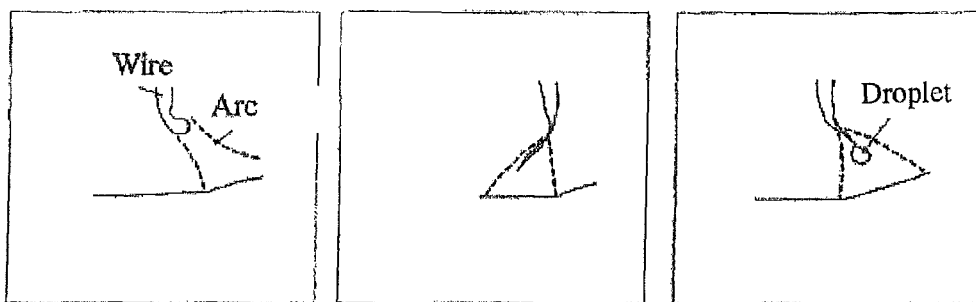
FIGS. 5(a) and 5(b) are diagrams schematically showing behaviors of arcs, respectively, when a potassium metal compound is not applied between layers and when it is applied.
Figure 5:
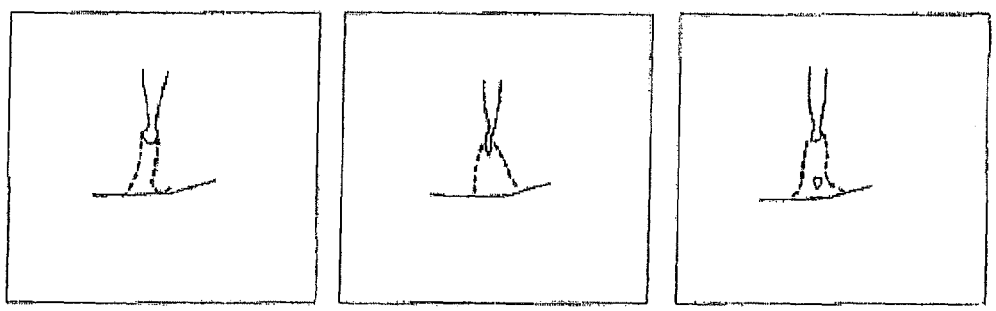
Figure 6:
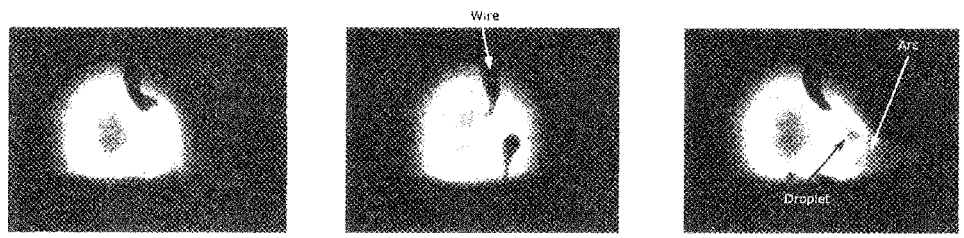
FIG. 6 shows photographs showing behaviors of arcs corresponding to FIGS. 5(a) and 5(b)
Figure 6:
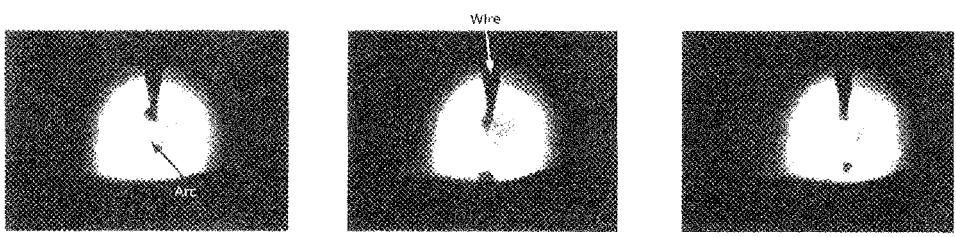

Potassium silicate water glass (chemical composition: about 25 wt % $SiO_2$, about 15 wt % $K_2O$, about 1 wt % $Na_2O$, and the balance being water) as a potassium metal compound was applied between the layers of laminate materials in the welding wires shown in the Test Examples 1 to 3. Because the potassium metal compound was enclosed in the inside of the welding wire, the application state was stable without peeling during welding wire feeding. This welding wire was made a cathode and arc welding was conducted in a pure argon gas atmosphere. FIG. 5(a) shows the case where the potassium metal compound was not applied between the layers; FIG. 5(b) shows the case where the potassium metal compound was applied between the layers. The interlayer application of the potassium metal compound suppressed the spread of arc in the welding edge (anode area) of the welding wire. In FIG. 6, photographs corresponding to those in FIG. 5 were shown.

Figure 7:
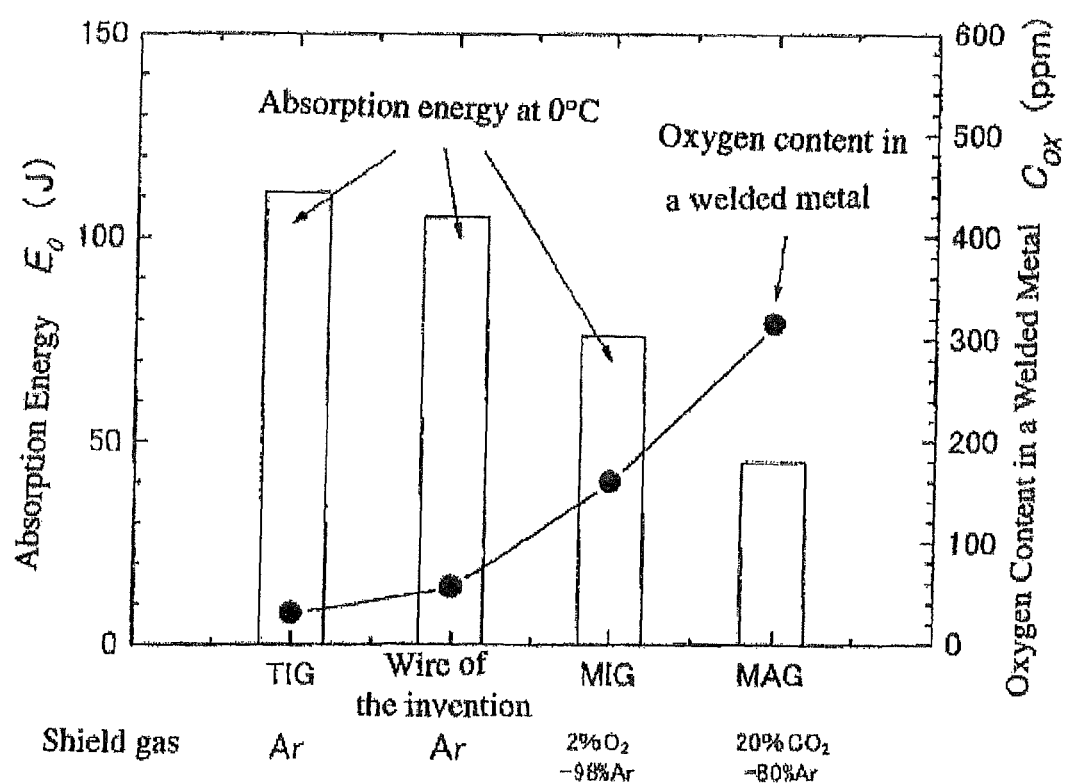
FIG. 7 is a diagram showing the relationship between the oxygen content and toughness of welded sites for comparison.

The oxygen content in a welded metal and the toughness after welding produced by welding using a welding wire in which a potassium metal compound was enclosed between the layers was determined. As shown in FIG. 7, the oxygen content is 56 ppm, and an absorption energy value of 105 J at 0° C. indicating toughness is obtained. It is confirmed that excellent welding substantially equivalent to the TIG welding was carried out.

FIG. 7 shows as reference examples measurements of the oxygen contents in welded metals and the toughness by means of the MIG welding using 98% Ar-2% $O_2$ gas and the MAG welding using 80% Ar-20% $CO_2$ gas, along with the TIG welding using pure argon. The measurements of the oxygen content in welded metals and the toughness by means of the MIG welding and the MAG welding of the same consumable electrode (welding wire) type as the welding method of the present invention are far inferior to the results of the welding method of the present invention.

Figure 8:
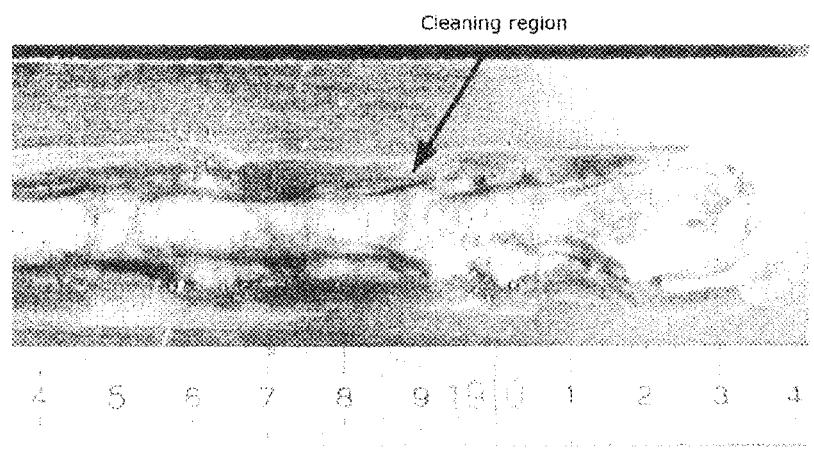
FIGS. 8(a) and 8(b) show photographs of welded sites when a potassium metal compound is not applied between layers and when applied, respectively.
Figure 8:
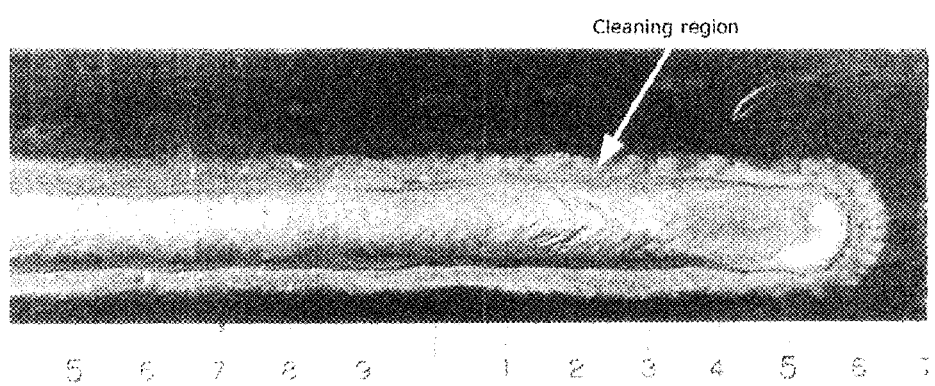

FIG. 8 shows photographs of welded sites after arc welding. Unless a potassium metal compound is applied between the layers, an unstable bead was formed due to the arc becoming unstable. On the other hand, application of a potassium metal compound between the layers made the arc stable, and a linear bead was obtained.

Example 2

Figure 9:
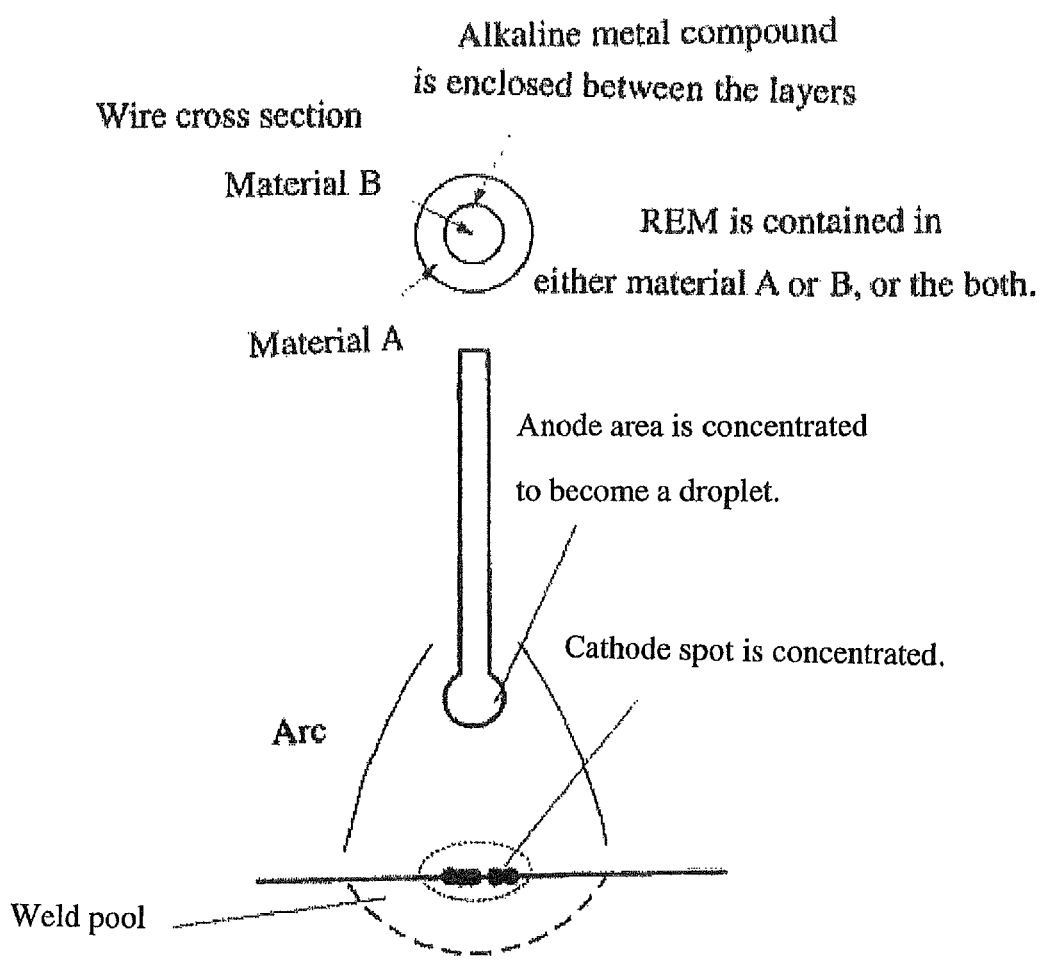
FIG. 9 is a diagram schematically showing the welding wire of Example 2 and a state during arc welding.
Figure 10:
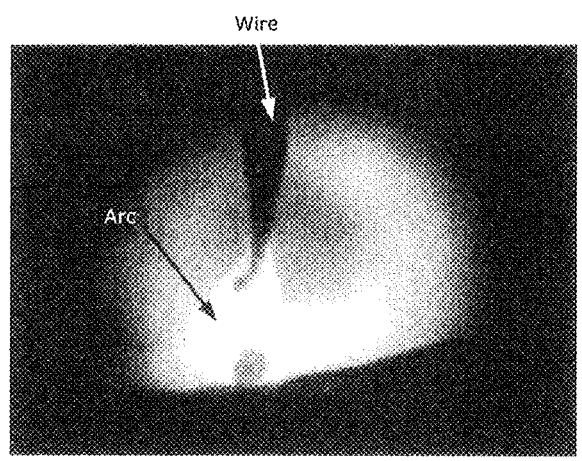
FIGS. 10(a) and 10(b) show, respectively, a photograph of an arc state of Example 2 during welding and a photograph of a welded site.
Figure 10:
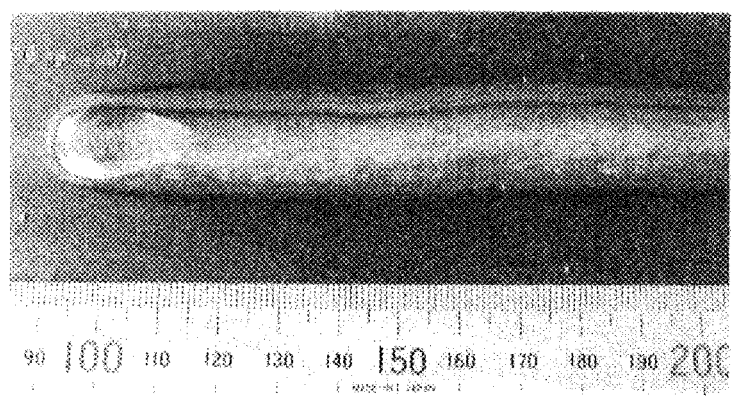

As shown in FIG. 9, a welding wire was fabricated in which the same potassium metal compound as in Example 1 was enclosed as an anode arc stabilizing element between the layers of a metal material containing a rare earth metal (REM) as a cathode stabilizing element. Arc welding was carried out in a pure argon gas using this welding wire. As shown in FIG. 9, in a droplet on the wire, an arc was concentrated because of the coexistence effect of potassium which is an anode arc stabilizing element even in a pure argon gas, whereby a stable droplet transfer was possible. In the weld pool, the cathode spot was concentrated because of a REM which is a cathode stabilizing element, so an arc did not unstably move around. Photographs of a welded site after arc welding are shown in FIG. 10. Because of a stable arc, a more stable bead without a cleaning region was obtained. The oxygen content of the welded site is 56 ppm, and it is confirmed that welding excellent in toughness is possible.

Moreover, in the examples, lamination was performed using a metal material produced by mixing a commercially available rare earth metal (REM) to fabricate a welding wire. However, a rare earth metal (REM) together with a potassium metal compound is enclosed between the layers of a metal material in which a rare earth metal (REM) is not mixed to thereby fabricate a welding wire. This welding wire is also expected to provide the same effect as that of the welding wire fabricated in the examples.

Example 3

A coaxial multilayer solid (CMS) wire (wire B) was produced. Wire B has an average composition that is almost the same as that of the materials for the welding of 9% Ni steel (wire A). The composition of wire A is shown in Table 4. The composition and cross-section of wire B is shown in Table 5 and FIG. 10, respectively. Wires C and D as follows were produced to investigate the influence of K:
 (i) Wire C: the potassium compound is added between the center wire and the hoop of
  wire B; with a 0.001% K concentration.
 (ii) Wire D: the potassium compound is added to wire B; with a 0.009% K concentration.

Figure 11:
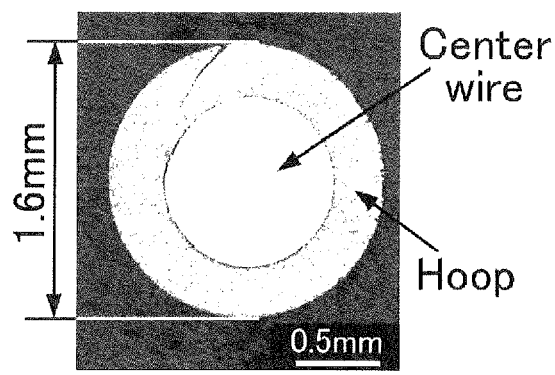
FIG. 11 shows cross-section of the coaxial multilayer solid wire (CMS wire).

The cross-section and the K content are shown in FIG. 11. The potassium compound ($SiO_2:K_2O=2:1$) of 0.01-0.05 g per 100 g of center wire was applied. The CMS wire was made by wrapping the hoop around the center wire. A welding wire with a diameter of 1.6 mm was obtained after the drawing process.

TABLE 4

| Wire | Composition, wt % | | | | |
|---|---|---|---|---|---|
| | C | Si | Mn | Ni | Fe |
| Wire A | 0.02 | 0.01 | 0.38 | 11.1 | Bal. |

TABLE 5

| Wire | | Composition, wt % | | | | |
|---|---|---|---|---|---|---|
| | | C | Si | Mn | Ni | Fe |
| Wire B | Center wire | 0.05 | 0.01 | 0.63 | 35.2 | Bal. |
| | Hoop | 0.02 | 0.0 | 0.14 | 0.0 | Bal. |

Figure 12:
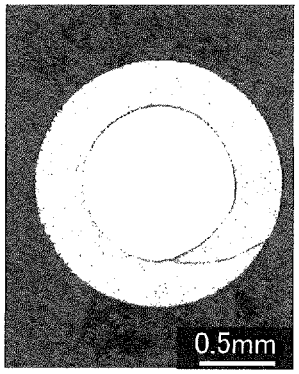
FIG. 12 shows cross-section of the coaxial multilayer solid wire and the K content.
Figure 12:
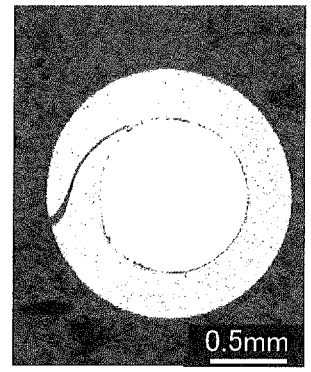
Figure 13:
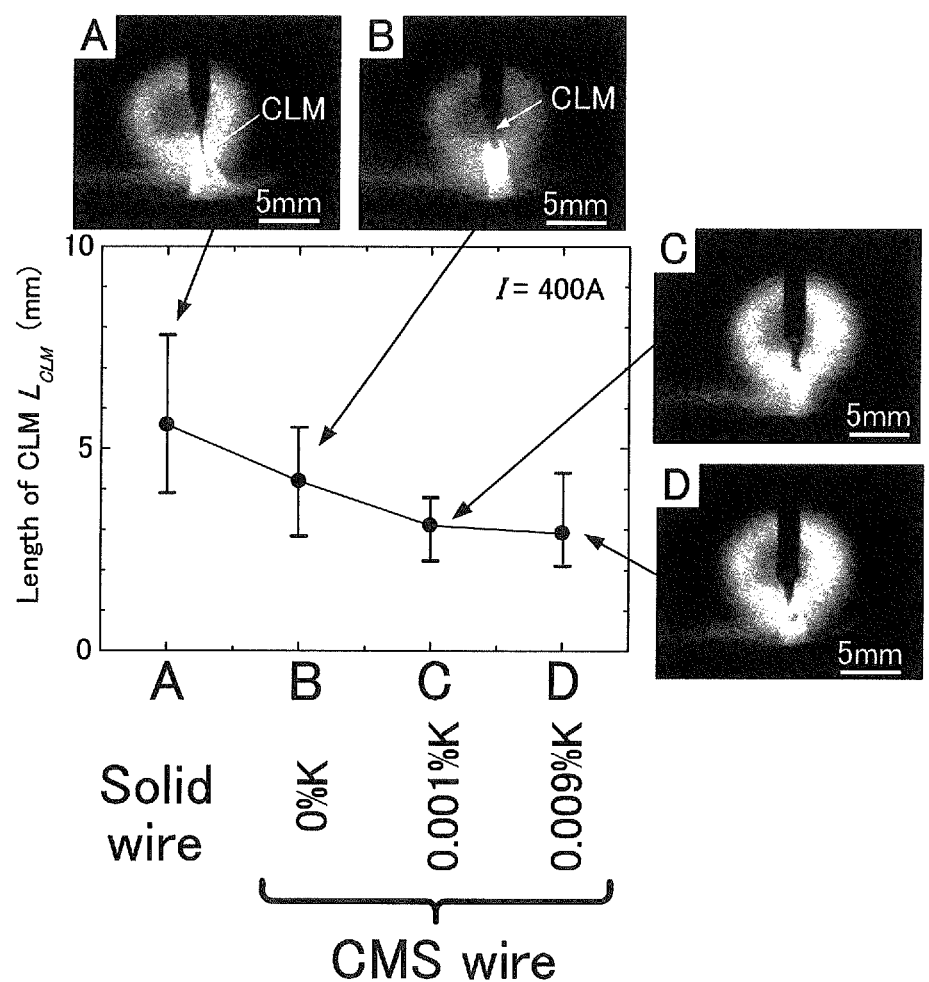
FIG. 13 shows change in the length of the column of liquid molten metal (CLM) and wire melting behavior for the solid wire and the CMS wire.

To investigate the effect of the alkali metal, the length and the shape of the column of the molten liquid metal (CLM) of wires B, C and D were compared. A short CLM was formed in wires C and D as shown in FIG. 12. The length of the CLM of wire B, which does not contain potassium, is 4.2 mm. The lengths of the CLM of wires C and D, which contain potassium, were 3.1 mm and 2.9 mm, respectively. Therefore, it is concluded that more than 10 ppm potassium is effective in shortening the CLM for stabilization of the welding.

The invention claimed is:

1. A welding wire, comprising:
 a hoop having an inner surface, and being formed from a metal material;
 a core wire having a surface, and being formed from a metal material; and
 an alkaline metal compound,
 wherein said hoop metal material and said core wire metal material are different from each other, a composition of said welding wire is divided into said hoop metal material and said core wire metal material, and said alkaline metal compound is disposed between said inner face of said hoop and said surface of said core wire, and an amount of said alkaline metal compound is from more than 10 ppm to 1000 ppm based on a weight of said welding wire, and
 wherein said welding wire does not contain a flux.

2. The welding wire according to claim 1, wherein said alkaline metal compound is a potassium metal compound.

3. A consumable electrode welding method using a welding wire which comprises
 a hoop having an inner surface, and being formed from a metal material;
 a core wire having a surface, and being formed from a metal material; and
 an alkaline metal compound,
 wherein said hoop metal material and said core wire metal material are different from each other, a composition of said welding wire is divided into said hoop metal material and said core wire metal material, and said alkaline metal compound is disposed between said inner face of said hoop and said surface of said core wire, and an amount of said alkaline metal compound is from more than 10 ppm to 1000 ppm based on a weight of said welding wire,
 wherein said consumable electrode welding method comprising using said welding wire as an anode and conducting the welding in a shield gas which contains an inert gas with a concentration of 99.5% or more, and
 wherein said welding wire does not contain a flux.

\* \* \* \* \*